(12) United States Patent
Sidapara

(10) Patent No.: US 10,320,178 B2
(45) Date of Patent: Jun. 11, 2019

(54) METHOD AND APPARATUS FOR CONTINUOUS SHORT-CIRCUIT PROTECTION

(71) Applicant: Murata Manufacturing Co., Ltd., Nagaokakyo-shi, Kyoto-fu (JP)

(72) Inventor: Rohit Sidapara, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/104,402

(22) Filed: Aug. 17, 2018

(65) Prior Publication Data

US 2018/0358799 A1 Dec. 13, 2018

Related U.S. Application Data

(63) Continuation of application No. 14/426,178, filed as application No. PCT/US2013/053369 on Aug. 2, 2013, now Pat. No. 10,074,968.

(60) Provisional application No. 61/697,346, filed on Sep. 6, 2012.

(51) Int. Cl.
| | | |
|---|---|---|
| *H02H 3/087* | (2006.01) | |
| *H02H 7/10* | (2006.01) | |
| *H02H 3/08* | (2006.01) | |
| *H02M 1/32* | (2007.01) | |
| *H02H 3/06* | (2006.01) | |
| *H02H 7/12* | (2006.01) | |

(52) U.S. Cl.
CPC .......... *H02H 3/085* (2013.01); *H02H 3/066* (2013.01); *H02H 3/087* (2013.01); *H02H 7/10* (2013.01); *H02H 7/1213* (2013.01); *H02M 1/32* (2013.01)

(58) Field of Classification Search
CPC ........ H02H 3/085; H02H 3/066; H02H 3/087; H02H 7/10; H02M 1/32
USPC ......................................... 361/93.7
See application file for complete search history.

(56) References Cited

U.S. PATENT DOCUMENTS

| | | | | |
|---|---|---|---|---|
| 3,283,173 A | * | 11/1966 | Marcus | H03K 5/00 327/484 |
| 5,371,754 A | * | 12/1994 | Berndt | G01C 19/661 356/459 |
| 5,392,206 A | * | 2/1995 | Peterson | H02M 3/3385 363/19 |
| 7,268,992 B2 | * | 9/2007 | Hallak | H02H 3/087 361/9 |

(Continued)

OTHER PUBLICATIONS

Sidapara, "Method and Apparatus for Continuous Short-Circuit Protection", U.S. Appl. No. 14/426,178, filed Mar. 5, 2015.

*Primary Examiner* — Zeev V Kitov
(74) *Attorney, Agent, or Firm* — Keating & Bennett, LLP

(57) ABSTRACT

A power-source protection circuit includes a power source including a first voltage rail and a second voltage rail, a pass switch connected across the first voltage rail and a third voltage rail, a control switch connected to the second voltage rail and a control terminal of the pass switch, such that the pass switch turns on in response to the control switch turning on and the pass switch turns off in response to the control switch turning off, and output terminals connected to the third voltage rail and the second voltage rail. The control switch is arranged to switch on when the power source is started and the control switch is arranged to switch off when the output terminals are short-circuited and to switch on when the short-circuit is removed.

6 Claims, 5 Drawing Sheets

(56) References Cited

U.S. PATENT DOCUMENTS

2014/0002941 A1\* 1/2014 James .................... H02H 3/207
361/91.6

\* cited by examiner

METHOD AND APPARATUS FOR CONTINUOUS SHORT-CIRCUIT PROTECTION

BACKGROUND OF THE INVENTION

1. Field of the Invention

The present invention relates to power sources. More specifically, the present invention relates protecting a DC power source when an output of the DC power source is short-circuited.

2. Description of the Related Art

Known DC-DC converters include switch-mode DC-DC converters that use a transformer to convert voltage from one level to another. An input DC voltage of the DC-DC converter is converted to a second voltage signal by an oscillator that includes the transformer, and the second voltage signal is rectified and filtered to provide an output DC voltage. In DC-DC converters, such as DC-DC converters that include Royer oscillators, it is known to separate the primary and secondary windings of the transformer so that the oscillator enters a high-frequency running mode when the output of the DC-DC converter is short-circuited.

The high-frequency running mode of a DC-DC converter occurs when the switching of the oscillator no longer depends on saturating the transformer core, and the oscillator instead switches before the saturation point of the transformer core is reached. In normal operation, the switching frequency of a Royer oscillator is governed by the following equation:

$$f = \frac{V_p}{4 \times B \times N_p \times A_e},$$

where $V_p$ is the voltage at the primary winding, B is the peak flux density of the transformer core, $N_p$ is the number of primary turns on the transformer, and $A_e$ is the effective cross-sectional area of the transformer core. However, during the high-frequency running mode of the DC-DC converter, the above equation is not followed, and the switching frequency increases to many times more than what the switching frequency is during normal operation.

In order for the oscillator to enter the high-frequency running mode, the primary and secondary windings are preferably separated in the transformer. Separating the primary and secondary windings in the transformer increases the leakage inductance of each of the primary and secondary windings and also reduces the capacitive coupling between the windings. The leakage inductances are caused by each of the primary and secondary windings having a self-inductance that is in series with a respective ohmic resistance. The capacitive coupling arises from the close spacing of the first and second primary windings. Current phase lag, which arises due to the leakage inductance, has been recognized as a possible cause of premature oscillator switching when there is an overload on the secondary winding. Accordingly, driving transistors included in DC-DC converters are often operated close to their maximum collector current ($I_C$) rating so that the driving transistors fall out of saturation during a short-circuit at the secondary winding, since the driving transistors are not able to meet the current demand during the short-circuit at the secondary winding.

A particular concern for known power sources is damage caused to components by overheating. Overheating of a component in a power source can be caused by excessive current flowing through the component due to a short-circuit at the output of a power source. Accordingly, various techniques have been used to protect against short-circuits at the outputs of known power sources.

Inline positive temperature coefficient (PTC) circuit elements have been used to limit currents in known power sources. The PTC circuit element, typically a thermistor, can be placed in series with the output of a power source. A PTC thermistor increases in resistance as temperature increases, which includes increasing heat within the thermistor. Accordingly, when the output of the power source is short-circuited, the power dissipation in the PTC circuit element increases due to increasing resistance in the PTC circuit element. Increasing the resistance of the PTC circuit element reduces the load of the short-circuit on the power source, helping to protect the power source from damage.

Current sensing has been used to detect short-circuits of power sources. Typically, current sensing is implemented by inserting a low-value current-sense resistor in series with the output of a power source. The voltage across the current-sense resistor is monitored because the voltage across the current-sense resistor is proportional to the current flowing through the current-sense resistor. If the voltage across the current-sense resistor rises above a predetermined level, a shutdown mechanism for the power source is activated to reduce the output of the power source, thereby helping to protect the power source from damage.

Thermal tripping has also been used to respond to short-circuits of power sources. In a similar manner to the current sensing above, a thermistor is thermally coupled to a critical semiconductor device or other component in a power source (e.g., a driving transistor). The temperature of the thermistor is then monitored and, if the temperature of the thermistor rises above a predetermined level, a shutdown mechanism can be activated to prevent any further heating and damage to the power source.

Many types of known short-circuit protection methods "latch", which causes the short-circuit protection mechanism or power source to stop operating and remain in a non-operative state even after the short-circuit is removed. For the short-circuit protection mechanism or power source to resume normal operation, input power must be disconnected and then reconnected for the short-circuit protection mechanism to "reset" or "unlatch".

SUMMARY OF THE INVENTION

To overcome the problems described above, preferred embodiments of the present invention provide continuous short-circuit protection for lower-power DC power sources.

A power-source protection circuit according to a preferred embodiment of the present invention includes a power source including a first voltage rail and a second voltage rail, a pass switch connected across the first voltage rail and a third voltage rail, a control switch connected to the second voltage rail and a control terminal of the pass switch, such that the pass switch turns on in response to the control switch turning on and the pass switch turns off in response to the control switch turning off, and output terminals connected to the third voltage rail and the second voltage rail. The control switch is arranged to switch on when the power source is started and the control switch is arranged to switch off when the output terminals are short-circuited and to switch on when the short-circuit is removed.

Preferably, the power-source protection circuit further includes a first resistor connected to the first voltage rail and the third voltage rail and in parallel with the pass switch, a second resistor connected to the first voltage rail and the control terminal of the pass switch, and a third resistor connected to the third voltage rail and a control terminal of the control switch. Preferably, the power-source protection circuit also includes a fourth resistor connected between the control switch and the control terminal of the pass switch. The first resistor is preferably a thermistor with a positive temperature coefficient. The pass switch is preferably delayed from switching on by a time constant related to a resistance of the first resistor and a capacitance of a load applied to the output terminals.

Preferably, the power-source protection circuit further includes a Zener diode in parallel with the second resistor. The pass switch is preferably a metal oxide semiconductor field effect transistor or a bipolar junction transistor, and the control switch preferably is a bipolar junction transistor.

Preferably, the power-source protection circuit further includes a first resistor connected to the first voltage rail and the third voltage rail and in parallel with the pass switch, and the first resistor preferably has a resistance such that a voltage drop across the first resistor is less than or equal to a voltage output by the power source minus a base-to-emitter voltage drop of the control switch.

Preferably, the power-source protection circuit causes a current output from the power source at the first and second voltage rails to drop when the output terminals are short-circuited.

The power source is preferably a DC voltage source or a DC-DC converter. Preferably, the power source is a DC-DC converter that includes a Royer oscillator.

Preferably, the second voltage rail has a higher voltage than the first voltage rail. The first voltage rail is preferably a zero-voltage rail. Alternatively, the first voltage rail preferably has a higher voltage than the second voltage rail. Accordingly, the second voltage rail is preferably a zero-voltage rail.

A method of protecting a short-circuit of a power source according to a preferred embodiment of the present invention includes actively controlling current at a protected output by controlling a control switch to turn off in response to the protected output being short-circuited. Preferably, the method further includes controlling a pass switch to turn off in response to the control switch turning off.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

First and second preferred embodiments of the present invention will now be described with reference to FIGS. 1 to 5. In the preferred embodiments of the present invention, a protected output is provided by turning off a switch that connects a voltage rail of a power source to a protected voltage rail.

Figure 1:
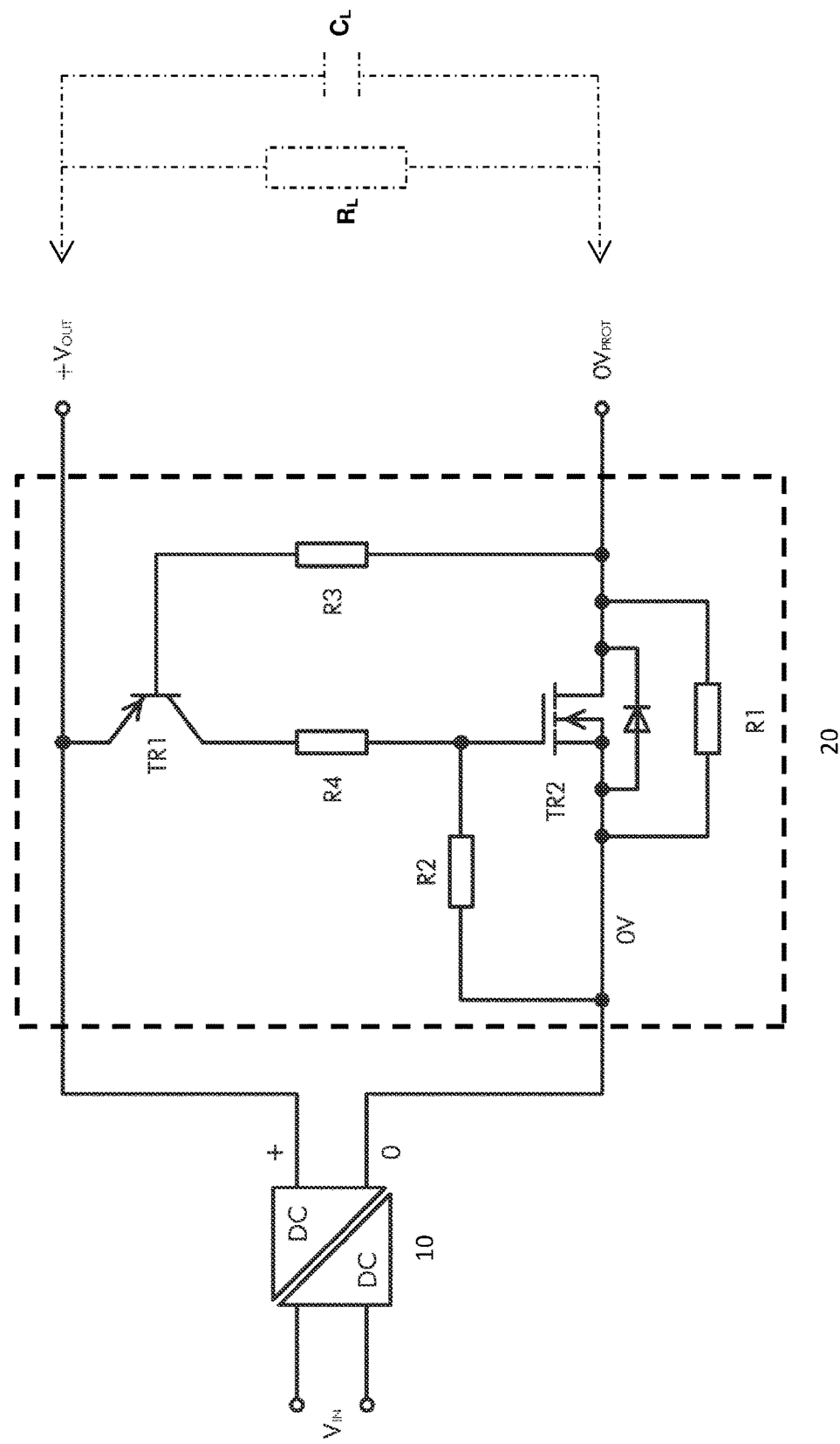
FIG. 1 shows a circuit diagram of a power-source protection circuit according to a first preferred embodiment of the present invention.

As shown in FIG. 1, according to a first preferred embodiment of the present invention, a DC-DC converter 10 receives an input voltage $V_{IN}$ and has an output that includes a positive-voltage rail $+V_{OUT}$ and a zero-voltage rail 0V. A power-source protection circuit 20 receives the output of the DC-DC converter 10 and provides a protected output that includes the output voltage $+V_{OUT}$ and a protected zero-voltage rail $0V_{PROT}$. Although the DC-DC converter 10 is preferably a low-power, Royer-based DC-DC converter, other types of DC-DC converters or DC power supplies can be used.

As shown in FIG. 1, the power-source protection circuit 20 protects the zero-voltage rail 0V of the DC-DC converter 10 against short-circuiting. Accordingly, the protected output is provided by the power-source protection circuit 20 at the positive-voltage rail $+V_{OUT}$ and the protected zero-voltage rail $0V_{PROT}$. The zero-voltage rail 0V and the protected zero-voltage rail $0V_{PROT}$ can be replaced by, for example, a negative voltage rail $-V_{OUT}$ and a protected negative voltage rail $-V_{OUT(PROT)}$, and the positive-voltage rail $+V_{OUT}$ can be replaced by a zero-voltage rail.

The power-source protection circuit 20 preferably includes a control transistor TR1, a pass transistor TR2, a start-up resistor R1, a gate-bias/discharge resistor R2, a base-current limiting resistor R3, and a gate-bias resistor R4.

As shown in FIG. 1, the control transistor TR1 is preferably a PNP bipolar junction transistor (BJT) and the pass transistor TR2 is preferably an N-channel Metal Oxide Semiconductor Field Effect Transistor (MOSFET). However, the preferred embodiments of the present invention are not limited thereto and, for example, the pass transistor TR2 can be an NPN BJT. As shown in FIG. 1, the emitter of the control transistor TR1 is connected to the positive-voltage rail $+V_{OUT}$, the base of the control transistor TR1 is connected to the protected zero-voltage rail $0V_{PROT}$ (preferably, through the base-current limiting resistor R3), and the collector of the control transistor TR1 is connected to the gate of the pass transistor TR2 (preferably, through the gate-bias resistor R4). As shown in FIG. 1, the source of the pass transistor TR2 is connected to the zero-voltage rail 0V, the gate of the pass transistor TR2 is connected to the collector of the control transistor TR1 (preferably, through the resistor R4), and the drain of the pass transistor TR2 is connected to the protected zero-voltage rail $0V_{PROT}$.

Preferably, the start-up resistor R1 is connected to the source and the drain of the pass transistor TR2, that is, in parallel to the pass transistor TR2. Further, the gate-bias/discharge resistor R2 is preferably connected across the source and gate of the pass transistor TR2.

Preferably, the pass transistor TR2 has a low drain-to-source on-resistance $R_{DS(on)}$ to reduce power dissipation during normal operation of the DC-DC converter 10 and the power-source protection circuit 20. The pass transistor TR2 is preferably selected so that the drain-to-source on-resistance $R_{DS(on)}$ is as low as possible at the expected output current and in accordance with the characteristics of the DC-DC converter 10, in order to increase efficiency and improve load regulation. The low drain-to-source on-resistance $R_{DS(on)}$ also helps limit the effect of the pass transistor TR2 on load regulation. The resistance values of resistors R2, R3, and R4 are preferably set as high as possible to reduce power loss during normal operation of the DC-DC converter 10 and the power-source protection circuit 20. The resistance value of the start-up resistor R1 is preferably chosen based upon the minimum load impedance that is to be driven by the DC-DC converter 10. That is, the resistance value of the start-up resistor R1 is preferably set as high as possible to reduce power dissipated by the start-up resistor R1 if a short-circuit occurs, but not so high that the power-source protection circuit 20 is unable to start-up or recover following a short-circuit.

During start-up of the DC-DC converter 10 and the power-source protection circuit 20, the control transistor TR1 is switched on (i.e., so that current flows between the emitter and the collector of the control transistor TR1) by current flowing from the base of the control transistor TR1 to the zero-voltage rail 0V, via the base-current limiting resistor R3 and the start-up resistor R1. Current flows from the base of the control transistor TR1 because the control transistor TR1 is a PNP transistor. Current through the emitter and the collector of the control transistor TR1 flows to the gate of the pass transistor TR2 via gate-bias resistor R4, so as to switch on the pass transistor TR2 (i.e., so that current flows between the drain and the source of the pass transistor TR2). Accordingly, current from the protected zero-voltage rail $0V_{PROT}$ flows through the drain and the source of the pass transistor TR2, such that a load (shown by a resistive load $R_L$ and a capacitive load $C_L$ in FIG. 1) is supplied by the output of the power-source protection circuit 20 (i.e., when the load is connected across the positive-voltage rail $+V_{OUT}$ and the protected zero-voltage rail $0V_{PROT}$). The resistive load $R_L$ and the capacitive load $C_L$ shown in FIG. 1 represent the combined resistive and capacitive components of the load supplied by the output of the power-source protection circuit 20.

If the output of the power-source protection circuit 20 is short-circuited (i.e., if the positive-voltage rail $+V_{OUT}$ and the protected zero-voltage rail $0V_{PROT}$ are short-circuited), the protected zero-voltage rail $0V_{PROT}$ is forced to a high voltage level by the short-circuit. If the protected zero-voltage rail $0V_{PROT}$ reaches a voltage level close to that of the positive-voltage rail $+V_{OUT}$, the control transistor TR1 switches off, which causes the pass transistor TR2 to also switch off. When the short-circuit is removed, the control transistor TR1 is switched on by current flowing from the base of the control transistor TR1 to the zero-voltage rail 0V, via the base-current limiting resistor R3 and the start-up resistor R1.

During start-up of the DC-DC converter 10 and the power-source protection circuit 20, or during recovery of the power-source protection circuit 20 after a short-circuit is removed, the following condition is preferably satisfied:

$$V_{R1} \le V_{OUT} - V_{be},$$

where $V_{R1}$ is the voltage across the start-up resistor R1.

The base-to-emitter voltage $V_{be}$ of the control transistor TR1 is preferably about 0.7 V, for example, and preferably does not vary regardless of the voltages applied to the base, the collector, and the emitter of the control transistor TR1. However, the value of the base-to-emitter voltage $V_{be}$ of the control transistor TR1 can vary depending upon the component used for the control transistor TR1.

If the resistive load $R_L$ is connected at the output of the power-source protection circuit 20 to the positive-voltage rail $+V_{OUT}$ and the protected zero-voltage rail $0V_{PROT}$, then the resistive load $R_L$ forms a voltage divider with the start-up resistor R1. Accordingly, the resistance value of the start-up resistor R1 is preferably chosen so that the above condition for $V_{R1}$ is met when the resistive load $R_L$ is at a minimum possible resistance value (i.e. when the load current is at a maximum value).

If the capacitive load $C_L$ is connected at the output of the power-source protection circuit 20 to the positive-voltage rail $+V_{OUT}$ and the protected zero-voltage rail $0V_{PROT}$, then the capacitive load $C_L$ preferably charges to $V_{be}$ (approximately 0.7 V) through the start-up resistor R1 before the power-source protection circuit 20 can start. The charging of the capacitive load $C_L$ causes a time delay because of a time constant related to the start-up resistor R1 and the capacitive load $C_L$, which can be calculated as follows:

$$t_{delay} = -\ln\left[1 - \frac{V_{be}}{V_{OUT}}\right] \cdot R_1 C_L.$$

The gate-bias/discharge resistor R2 serves two purposes for the power-source protection circuit 20. First, the gate-bias/discharge resistor R2 functions as a pull-down resistor to discharge the gate of the pass transistor TR2 (to the zero-voltage rail 0V), so as to switch off the pass transistor TR2 when the control transistor TR1 is off. Second, the gate-bias/discharge resistor R2 forms a voltage divider with the gate-bias resistor R4, so as to limit the voltage applied to the gate of the pass transistor TR2 when the control transistor TR1 is on. Preferably, the resistances of the resistors R2 and R4 are selected so that the maximum rated gate voltage of the pass transistor TR2 is not exceeded when the control transistor TR1 is on.

Figure 2:
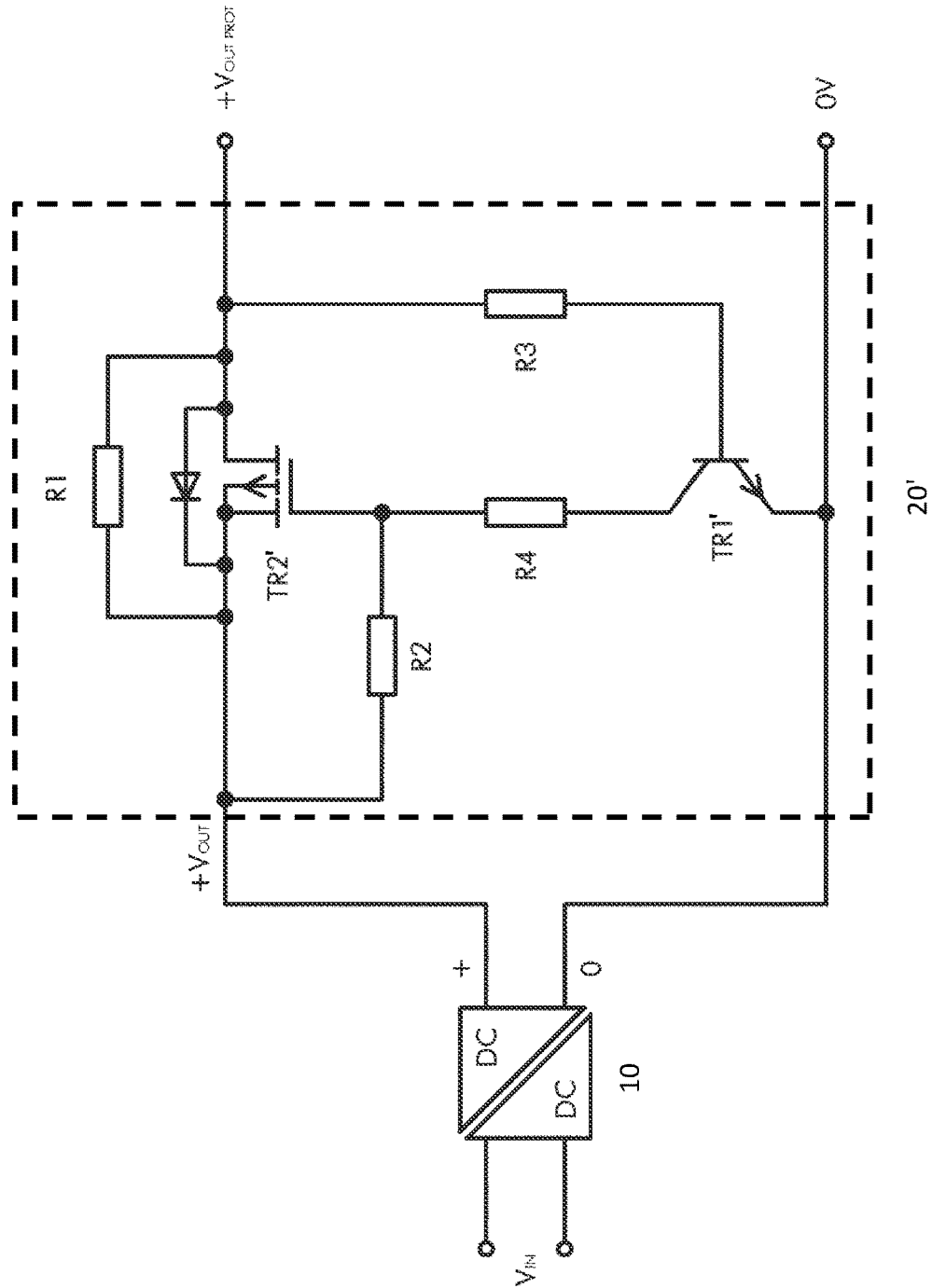
FIG. 2 shows a circuit diagram of a power-source protection circuit according to a second preferred embodiment of the present invention.

According to the second preferred embodiment of the present invention, the protected output can be provided by including a pass transistor TR2' between the positive-voltage rail $+V_{OUT}$ and a protected positive-voltage rail $+V_{OUT(PROT)}$. FIG. 2 shows a power-source protection circuit 20' according to the second preferred embodiment of the present invention, which provides a protected output across the protected positive-voltage rail $+V_{OUT(PROT)}$ and the zero-voltage rail 0V. As shown in FIG. 2, the power-source protection circuit 20' includes components similar to the power-source protection circuit 20 shown in FIG. 1. However, the control transistor TR1' of the power-source protection circuit 20' is preferably a NPN BJT, and the pass transistor TR2' of the power-source protection circuit 20' is preferably a P-channel MOSFET.

According to the preferred embodiments of the present invention, a single protected output is provided by the voltage difference between two voltage rails. Accordingly, it is only necessary to include a switch in one of the two voltage rails in order to break the circuit and protect the power supply that supplies the two voltage rails.

According to the preferred embodiments of the present invention, a protected output for a power source is achieved by using a low number of components in a power-source protection circuit. Particularly, the protected output is obtained by using only two transistors and four resistors in the power-source protection circuit. Accordingly, the power-source protection circuit according to the preferred embodiments of the present invention can be implemented in a relatively small amount of space, e.g., in applications where a limited footprint is available on a circuit board. The low number of components used in the power-source protection circuit according to the preferred embodiments of the present invention also allows for a protected output to be obtained at low cost.

Figure 3:
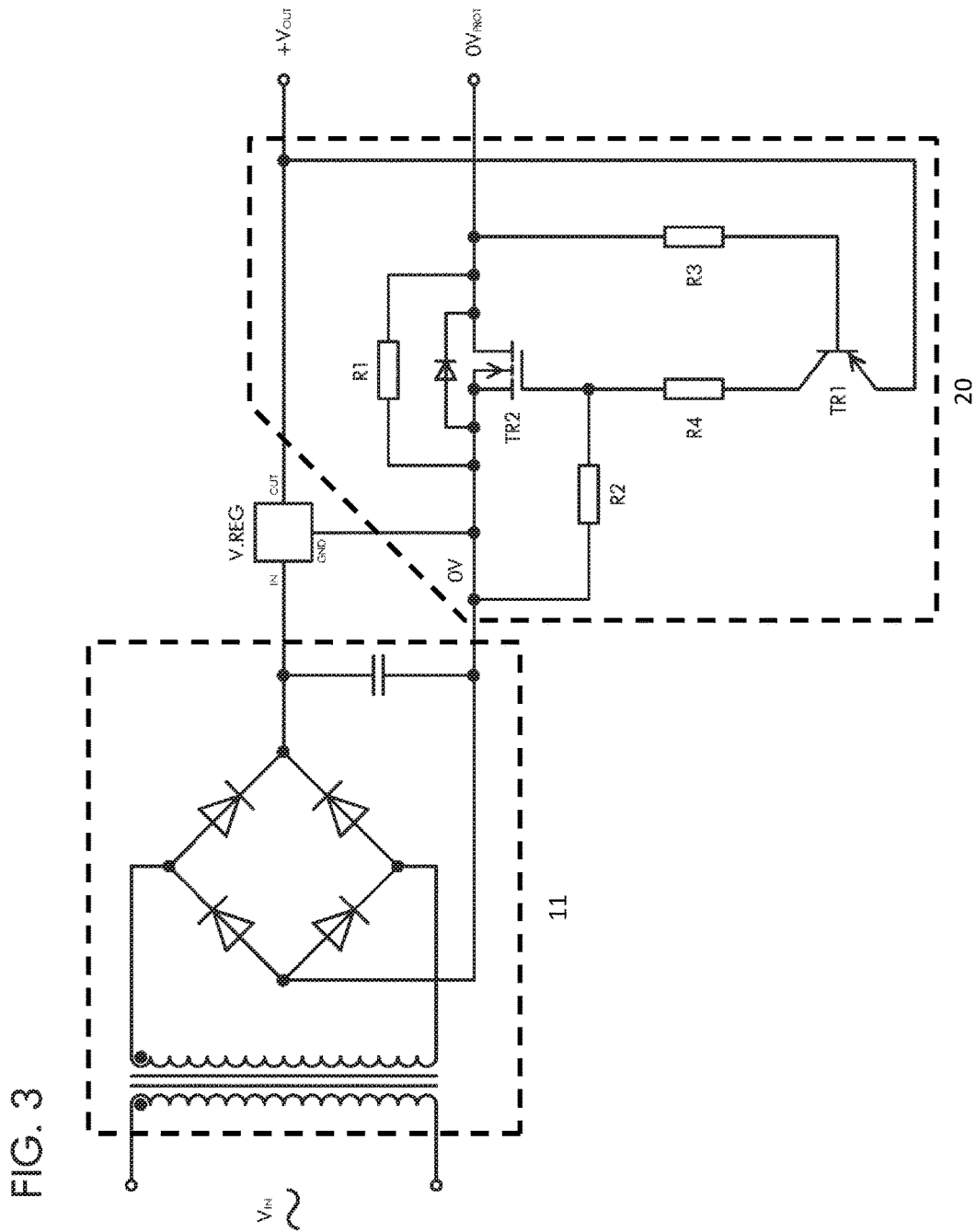
FIG. 3 shows a circuit diagram of the power power-source protection circuit of FIG. 1 being used to protect a DC power supply.
Figure 4:
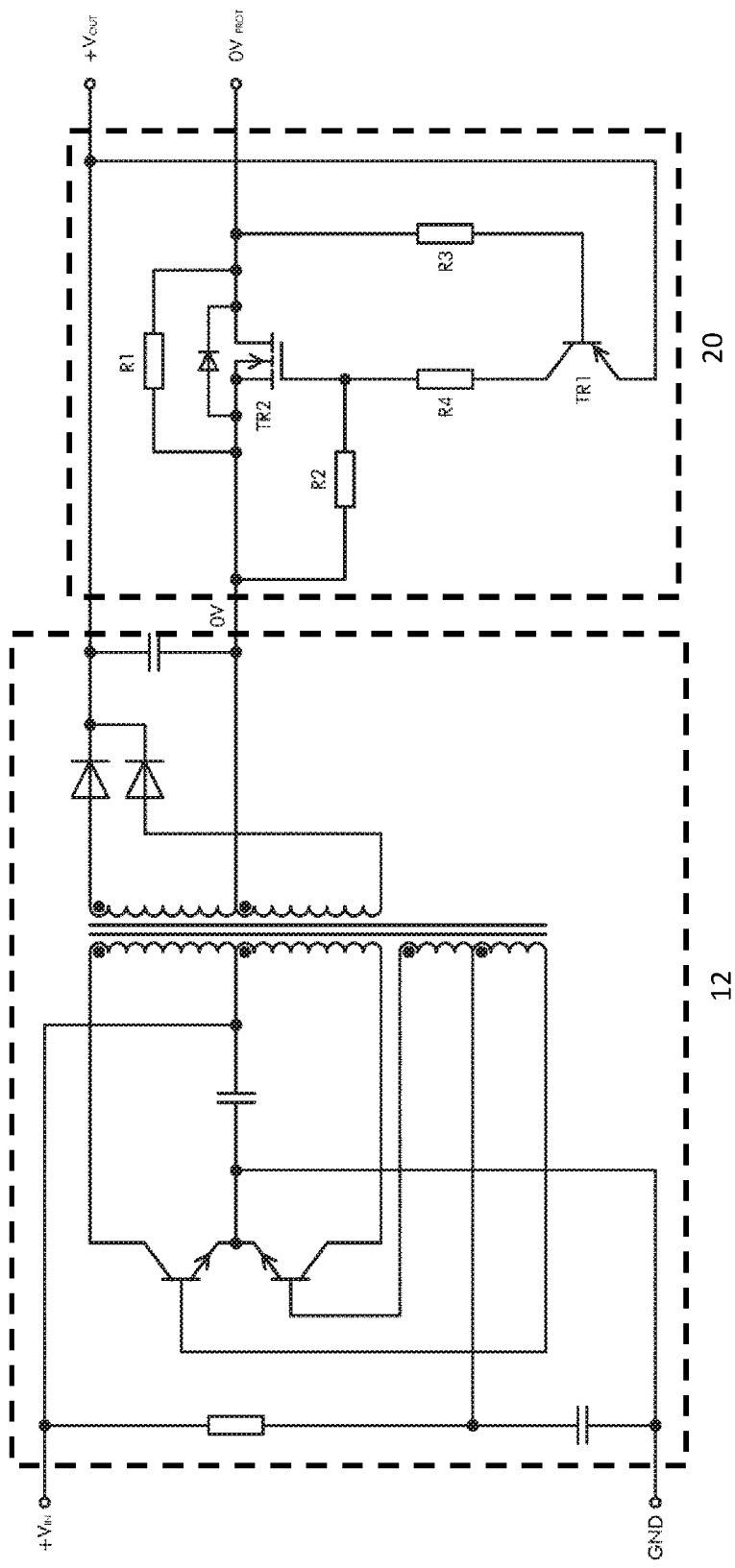
FIG. 4 shows a circuit diagram of the power power-source protection circuit of FIG. 1 being used to protect a Royer-based DC-DC converter.

According to the preferred embodiments of the present invention, the power-source protection circuit can be used with existing power sources, including Royer-based DC-DC converters. Although the DC-DC converter 10 is preferably a low-power, Royer-based DC-DC converter, other types of DC-DC converters or DC power supplies can be used. As shown in FIG. 3, the power-source protection circuit 20 can be used with a DC power supply 11. A voltage regulator V.REG is included to smooth the output voltage of the DC power supply 11. As shown in FIG. 4, the power-source protection circuit 20 can be used with a Royer-based DC-DC converter 12. It is noted that the power-source protection circuit 20' can also be used with the DC power supply 11 and the Royer-based DC-DC converter 12 in a circuit arrangement similar to FIG. 2.

The power-source protection circuit according to the preferred embodiments of the present invention provides continuous short-circuit protection with current fold-back, such that the current output from the power-source protection circuit is limited when the protected output is short-circuited. Current fold-back occurs when an input current drops (i.e., folds-back) during a short-circuit condition to a current level that is below the current level during normal operation. Current fold-back helps to ensure that the power source is not overloaded and that power is not unnecessarily dissipated, which could otherwise result in the heating of components and possible damage and failure.

The power-source protection circuit according to the preferred embodiments of the present invention also provides automatic recovery when the short-circuit is removed from the protected output. Accordingly, it is not necessary for power to be cycled following a short-circuit to resume normal operation (e.g., disconnecting the power source from the power-source protection circuit or restarting the power source). That is, the power-source protection circuit according to the preferred embodiments of the present invention does not "latch" when a short-circuit occurs.

If the power-source protection circuit according to the preferred embodiments of the present invention is used to protect an unregulated (for example, a Royer-based) DC-DC converter, the components of the power-source protection circuit prevent the output voltage from rising to excessive levels under zero-load conditions. Particularly, the resistors R2, R3, and R4 apply a small load to the DC-DC converter to stop the protected output voltage from rising too high.

The preferred embodiments of the present invention also provide a soft-start condition to aid in reliable start-up of DC-DC converters. Since the transistors included in the power-source protection circuit have turn-on times, there is a delay before the pass transistor switches on. Accordingly, a DC-DC converter is not subjected to full load at the output of the power-source protection circuit until after the switch-on delay. Further, if there is a capacitive load $C_L$ at the output of the power-source protection circuit, this capacitor preferably provides a further time delay according to the time constant related to the start-up resistor R1 and the capacitive load $C_L$.

The preferred embodiments of the present invention also provide a low quiescent power for the operation of the power-source protection circuit. Particularly, the resistance values of the resistors R2, R3, and R4 are preferably chosen to be high as possible so that the power dissipated by the resistors R2, R3, and R4 is minimized during normal operation.

According to the preferred embodiments of the present invention, a thermistor with a positive temperature coefficient can be used for the start-up resistor R1 to help reduce the power dissipated by the start-up resistor R1 when the protected output is short-circuited.

According to the preferred embodiments of the present invention, the gate-bias resistor R4 can be omitted from the power-source protection circuit if the output voltage across the rails of the power source is less than the maximum gate-to-source voltage $V_{GS}$ rating of the control transistor TR2, TR2' of the power-source protection circuit.

Figure 5:
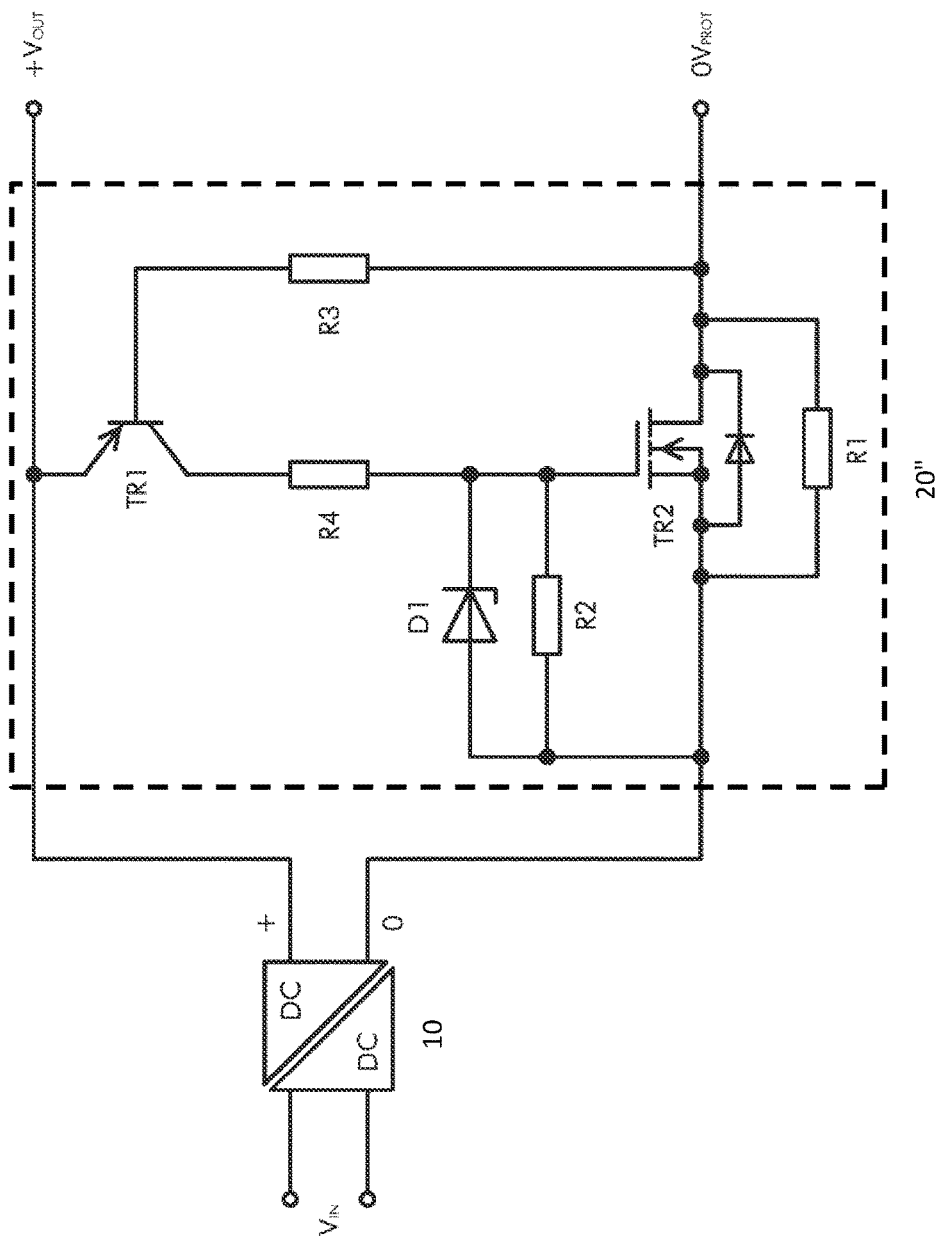
FIG. 5 shows a circuit diagram of the power source protection circuit of FIG. 1 modified to include a Zener diode.

According to the preferred embodiments of the present invention, a Zener diode D1 can be placed in parallel with the gate-bias/discharge resistor R2, as shown in the power source protection circuit 20" of FIG. 5, if there are large voltage spikes in the output voltage across the rails of the power source. The Zener diode D1 is preferably included if the voltage spikes in the output voltage across the rails of the power source are higher than the maximum gate-to-source voltage $V_{GS}$ of the control transistor TR2 of the power-source protection circuit. Preferably the Zener diode D1 is chosen to have a Zener voltage that prevents the maximum rated gate-to-source voltage $V_{GS}$ of the control transistor TR2 from being exceeded. The Zener diode D1 can also be placed in parallel with the gate-bias/discharge resistor R2 in the preferred embodiments shown in FIGS. 2-4.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A power-source protection circuit comprising:
   a power source including a DC-DC converter with a Royer oscillator connected to a first voltage rail and a second voltage rail;
   a pass switch including a control terminal, a first terminal, and a second terminal, wherein the first terminal is directly connected to the first voltage rail and the second terminal is directly connected to a third voltage rail;
   a control switch including a control terminal, a first terminal, and a second terminal, wherein the first terminal of the control switch is directly connected to the second voltage rail, the second terminal of the control switch is connected to the control terminal of the pass switch such that the pass switch turns on in response to the control switch turning on and the pass switch turns off in response to the control switch turning off, and the control terminal of the control switch is either directly connected to the second terminal of the pass switch via the third voltage rail or directly connected to a first resistor that is directly connected to the second terminal of the pass switch via the third voltage rail;
   output terminals connected to the third voltage rail and the second voltage rail; and
   a second resistor connected to the first voltage rail and the third voltage rail and in parallel with the pass switch; wherein the control switch is arranged to switch on when the power source is started; and the control switch is arranged to switch off when the output terminals are short-circuited and to switch on when the short-circuit is removed.

2. The power-source protection circuit according to claim 1, further comprising:

a third resistor connected to the first voltage rail and the control terminal of the pass switch.

3. The power-source protection circuit according to claim 2, further comprising:

a fourth resistor connected between the control switch and the control terminal of the pass switch.

4. The power-source protection circuit according to claim 2, wherein the second resistor is a thermistor with a positive temperature coefficient.

5. The power-source protection circuit according to claim 2, wherein the pass switch is delayed from switching on by a time constant related to a resistance of the second resistor and a capacitance of a load applied to the output terminals.

6. The power-source protection circuit according to claim 2, further comprising a Zener diode in parallel with the third resistor.

* * * * *